US010694397B2

(12) United States Patent
Guo et al.

(10) Patent No.: US 10,694,397 B2
(45) Date of Patent: Jun. 23, 2020

(54) BASE STATION ANTENNA ASSEMBLY HAVING FEED BOARD THEREIN WITH REDUCED PASSIVE INTERMODULATION (PIM) DISTORTION

(71) Applicant: CommScope Technologies LLC, Hickory, NC (US)

(72) Inventors: Pengfei Guo, Suzhou (CN); Ligang Wu, Suzhou (CN); Hangsheng Wen, Suzhou (CN); Jun Sun, Suzhou (CN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/163,667

(22) Filed: Oct. 18, 2018

(65) Prior Publication Data
US 2019/0116502 A1 Apr. 18, 2019

(30) Foreign Application Priority Data
Oct. 18, 2017 (CN) .......................... 2017 1 0967745

(51) Int. Cl.
*H04M 1/00* (2006.01)
*H04W 16/28* (2009.01)
(Continued)

(52) U.S. Cl.
CPC ............. *H04W 16/28* (2013.01); *H01P 5/085* (2013.01); *H01Q 1/246* (2013.01); *H01Q 21/065* (2013.01); *H04B 7/0408* (2013.01)

(58) Field of Classification Search
CPC ........ H04W 16/28; H01P 5/085; H01Q 1/246; H01Q 21/065; H04B 7/0408
(Continued)

(56) References Cited

U.S. PATENT DOCUMENTS

2002/0070437 A1 6/2002 Heerman
2005/0183885 A1 8/2005 Lo
(Continued)

FOREIGN PATENT DOCUMENTS

| CN | 101552375 A | 10/2009 |
|---|---|---|
| EP | 3166182 | 5/2017 |
| WO | 2016/148378 | 9/2016 |

OTHER PUBLICATIONS

Notification of Transmittal of the International Search Report and the Written Opinion of the International Searching Authority, or the Declaration, in corresponding PCT Application No. PCT/US2018/055796 dated (Jan. 25, 2019).

*Primary Examiner* — Amancio Gonzalez
(74) *Attorney, Agent, or Firm* — Myers Bigel, P.A.

(57) ABSTRACT

An antenna assembly includes a substrate having front and back surfaces thereon and a plurality of through-holes therein, along with a solder pad on the back surface of the substrate. An input cable is also provided, which is attached to the back surface of the substrate. The input cable includes an outer conductor, which contacts the back surface of the substrate, and an inner conductor, which extends at least partially through a first of the plurality of through-holes and is electrically connected to the solder pad. A metal trace (e.g., 50-ohm trace) is provided on the front surface of the substrate. The metal trace is electrically connected to the solder pad by electrically conductive plating in a second of the plurality of through-holes.

14 Claims, 11 Drawing Sheets

(51) Int. Cl.
*H01Q 21/06* (2006.01)
*H01Q 1/24* (2006.01)
*H04B 7/0408* (2017.01)
*H01P 5/08* (2006.01)

(58) Field of Classification Search
USPC .................................................... 455/575.5
See application file for complete search history.

(56) References Cited

U.S. PATENT DOCUMENTS

| | | | |
|---|---|---|---|
| 2006/0033666 A1* | 2/2006 | Su | H01Q 9/0414 343/700 MS |
| 2011/0061233 A1 | 3/2011 | Martinez-Vargas et al. | |
| 2016/0105961 A1* | 4/2016 | Dieu-Gomont | H01L 23/49855 174/254 |
| 2017/0170549 A1 | 6/2017 | Buondelmonte | |
| 2018/0159209 A1* | 6/2018 | Mikata | H01Q 1/526 |

* cited by examiner

BASE STATION ANTENNA ASSEMBLY HAVING FEED BOARD THEREIN WITH REDUCED PASSIVE INTERMODULATION (PIM) DISTORTION

REFERENCE TO PRIORITY APPLICATION

This application claims priority to Chinese Patent Application No. 201710967745.9, filed Oct. 18, 2017, the disclosure of which is hereby incorporated herein by reference.

FIELD OF THE INVENTION

The present invention relates to radio communications and antenna devices and, more particularly, to base station antenna arrays for cellular communications and methods of manufacturing same.

BACKGROUND

Figure 1A:
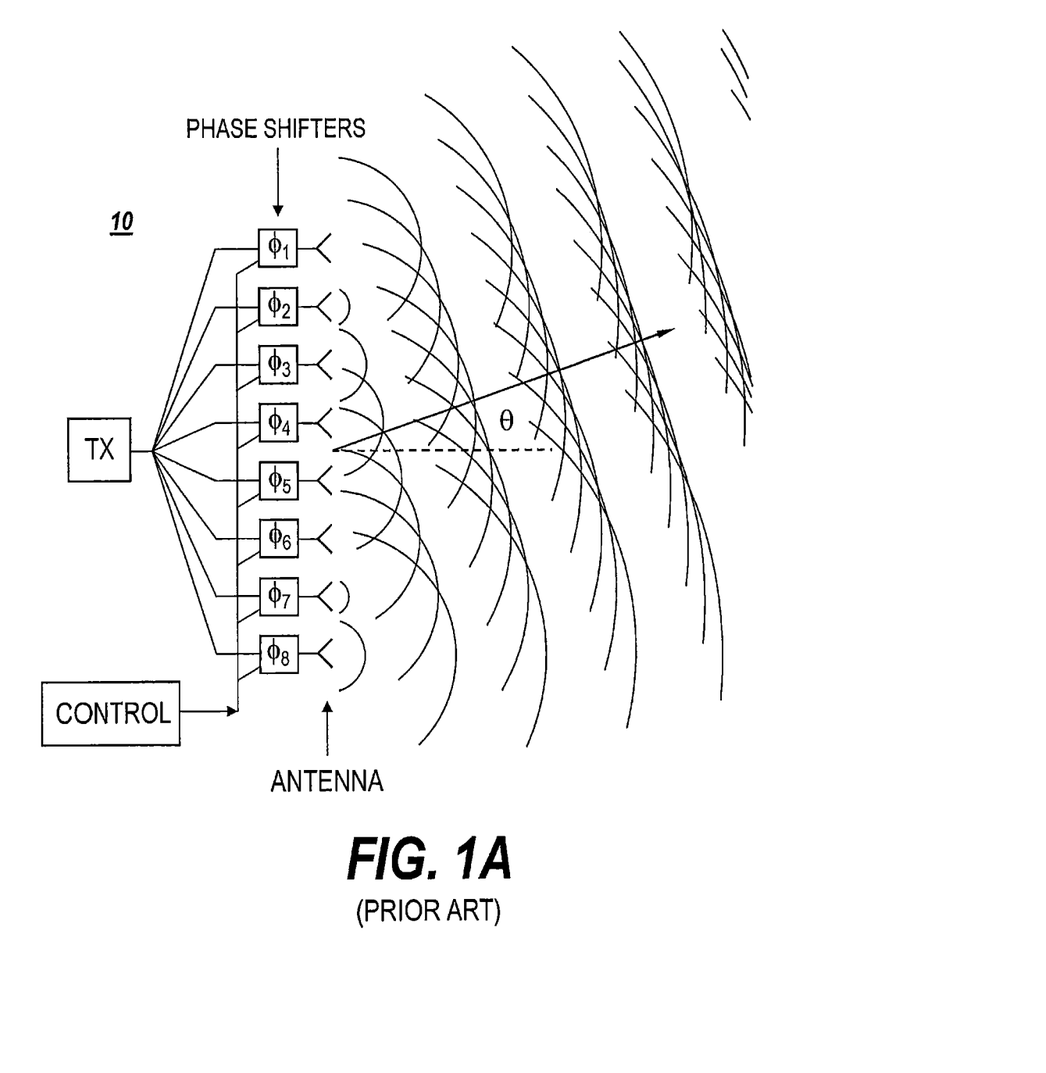
FIG. 1A is a block diagram of a phased array antenna according to the prior art.

Phased array antennas can create and electronically steer a beam of radio waves in varying directions without physical movement of the radiating elements therein. As shown by FIG. 1A, in a phased array antenna 10, radio frequency (RF) feed current is provided from a transmitter (TX) to a plurality of spaced-apart antenna radiating elements via phase shifters ($\phi_1$-$\phi_8$), which establish a desired phase relationship between the radio waves emitted by the spaced-apart radiating elements. As will be understood by those skilled in the art, a properly established phase relationship enables the radio waves emitted from the radiating elements to combine to thereby increase radiation in a desired direction (shown as θ), yet suppress radiation in an undesired direction(s). The phase shifters ($\phi_n$) are typically controlled by a computer control system (CONTROL), which can alter the phases of the emitted radio waves and thereby electronically steer the combined waves in varying directions. This electronic steering can be important when the phased array antennas are used in cellular communication and other RF-based systems.

Figure 1B:
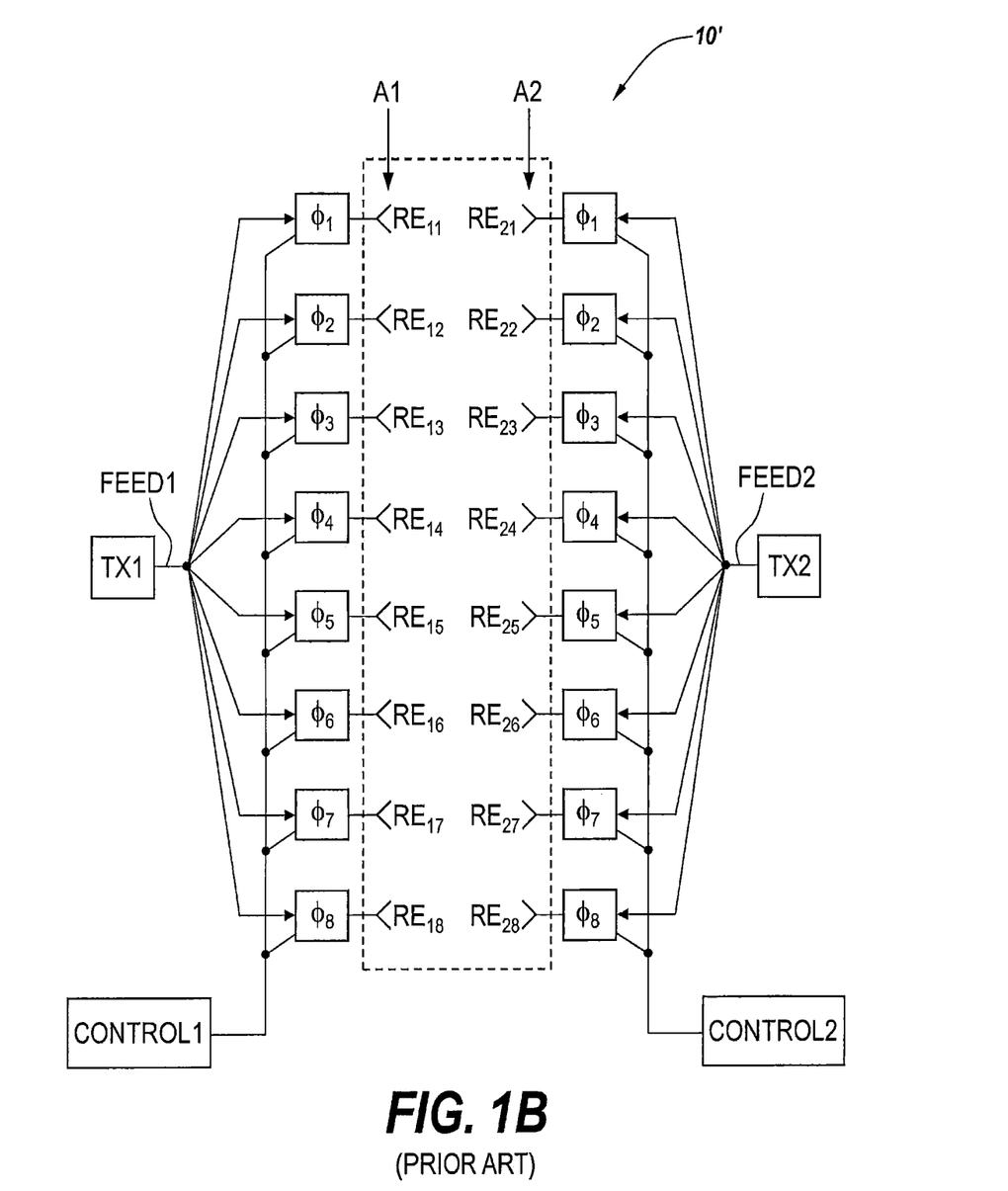
FIG. 1B is a block diagram of a base station antenna (BSA) according to the prior art.

For example, in a typical cellular communications system, a geographic area is often divided into a series of regions that are commonly referred to as "cells", which are served by respective base stations. Each base station may include one or more base station antennas (BSAs) that are configured to provide two-way radio frequency ("RF") communications with mobile subscribers that are within the cell served by the base station. In many cases, each base station is divided into "sectors." In perhaps the most common configuration, a hexagonally shaped cell is divided into three 120° sectors, and each sector is served by one or more base station antennas, which can have an azimuth Half Power Beam Width (HPBW) of approximately 65° per sector. Typically, the base station antennas are mounted on a tower or other raised structure and the radiation patterns (a/k/a "antenna beams") are directed outwardly therefrom. Base station antennas are often implemented as linear or planar phased arrays of radiating elements. For example, as shown by FIG. 1B, a base station antenna 10' may include side-by-side columns of radiating elements ($RE_{11}$-$RE_{18}$, $RE_{21}$-$RE_{28}$), which define a pair of relatively closely spaced antennas A1 and A2. In this base station antenna 10', each column of radiating elements may be responsive to respective phase-shifted feed signals, which are derived from corresponding RF feed signals (FEED1, FEED2) and transmitters (TX1, TX2) and varied in response to computer control (CONTROL1, CONTROL2).

Unfortunately, these phase-shifted feed signals are typically provided across multiple mechanical components before reaching a corresponding radiating element and these signal paths may degrade the feed signals by introducing unacceptable levels of passive intermodulation (PIM) distortion. As will be understood by those skilled in the art, PIM is the generation of interfering signals caused by nonlinearities in one or more mechanical components of a wireless system. Typically, two signals will mix together (amplitude modulation) to produce sum and difference signals (and products within the same band) and thereby cause interference. PIM is a problem in almost any wireless system, but is most noticeable in cellular base station antennas, transmission lines, and related components.

Junctions of dissimilar materials (e.g., different metals) are a prime cause of PIM. Thus, PIM may occur in antenna elements, coaxial connectors, coaxial cable, and grounds. PIM can also be caused by rust, corrosion, loose connections, dirt, oxidation, etc. Even the presence of nearby metal objects, such as guy wires, anchors and roof flashings may cause appreciable PIM by creating diode-like nonlinearities that operate as mixers. And, as the degree of nonlinearity increases, so do the amplitudes of the PIM signals. PIM may also increase as components age and in environments where there are wide temperature variations, salt air or polluted air, or excessive vibrations.

Figure 2:
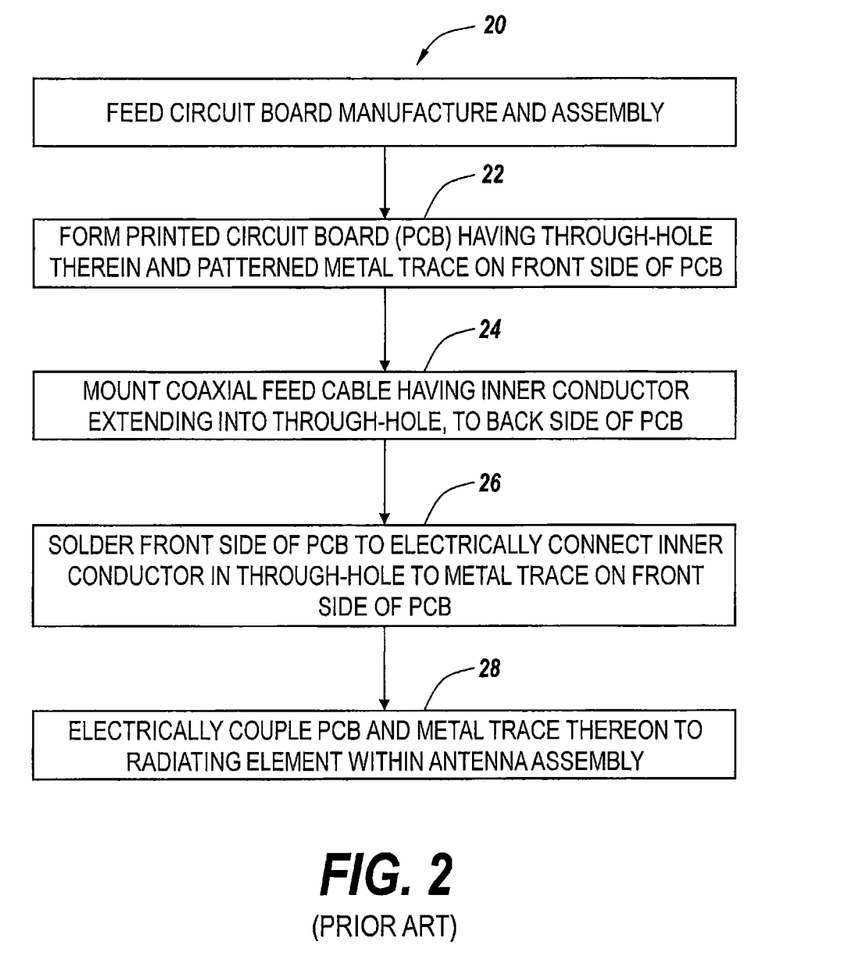
FIG. 2 is a flow diagram of process steps that illustrates methods of manufacturing feed circuit boards for base station antennas BSAs, according to the prior art.

Referring now to FIG. 2, conventional methods 20 of manufacturing feed circuit boards for base station antennas BSAs, which may be susceptible to relatively high levels of PIM distortion, may include forming a printed circuit board (PCB) having a through-hole (TH) therein, which may be an unplated through-hole (UTH) or a plated through-hole (PTH), and a patterned metal trace on a front side of the PCB, Block 22. As shown by Block 24, a coaxial feed cable having a shielded (and grounded) outer conductor and a signal-carrying inner "feed" conductor is mounted to a back side of the PCB, with the inner conductor extending through the through-hole TH and the outer conductor being soldered to a ground plane on the back side of the PCB. Next, as shown by Block 26, the front side of the PCB is soldered to thereby electrically connect the inner conductor within the through-hole TH to a metal trace on the front side of the PCB. Finally, as shown by Block 28, the PCB and metal trace thereon are electrically coupled (directly or indirectly) to a radiating element within an antenna assembly, using conventional operations known to those skilled in the art.

SUMMARY OF THE INVENTION

An antenna assembly according to some embodiments of the invention includes a substrate having front and back surfaces thereon and a plurality of through-holes therein, along with a solder pad on the back surface of the substrate. An input cable is also provided, which is attached to the back surface of the substrate. The input cable includes an outer conductor, which contacts the back surface of the substrate, and an inner "feed" conductor, which extends at least partially through a first of the plurality of through-holes and is electrically connected to the solder pad. A metal trace (e.g., 50-ohm trace) is provided on the front surface of the substrate. The metal trace is electrically connected to the solder pad by electrically conductive plating in a second of the plurality of through-holes, which is located adjacent the first of the plurality of through-holes and provides an electrical connection with low passive intermodulation (PIM) distortion.

According to some of these embodiments of the invention, the first of the plurality of through-holes, which receives the inner conductor, is at least partially devoid of electrically conductive plating extending therethrough. Nonetheless, the inner conductor is solder bonded to the solder pad on the back surface of the substrate and this solder pad at least partially surrounds the first of the plurality of through-holes.

In still further embodiments of the invention, the first and second of the plurality of through-holes may be filled with electrically conductive material. In addition, the metal trace on the front surface of the substrate may be electrically connected in parallel to the solder pad by electrically conductive plating in a third of the plurality of through-holes, which extends adjacent the second of the plurality of through-holes. In some embodiments, the second and third of the plurality of through-holes are filled with electrically conductive material and/or the second and third of the plurality of through-holes extend on opposite sides of the first of the plurality of through-holes. In some other embodiments, the first, second and third of the plurality of through-holes are aligned with each other along a length of the metal trace.

According to further embodiments of the invention, an antenna assembly may include a printed circuit board having front and back surfaces thereon and a plurality of through-holes therein. An electrically conductive pad and an electrically conductive feed conductor are provided on the back surface of the printed circuit board. The feed conductor extends at least partially through a first of the plurality of through-holes and is electrically connected to the electrically conductive pad (e.g., by a solder bond). A metal trace is also provided on the front surface of the printed circuit board. The metal trace is electrically connected to the electrically conductive pad by electrically conductive plating in a second of the plurality of through-holes, which may (or may not) be filled with electrically conductive material. In addition, the electrically conductive pad can be patterned to at least partially surround the first of the plurality of through-holes. In some of these embodiments of the invention, the electrically conductive feed conductor may be configured as an inner conductor of a shielded coaxial cable. And, a portion of the first of the plurality of through-holes, which extends adjacent the front surface of the printed circuit board, may be devoid of at least some solder and thereby contain a void extending between the feed conductor and a sidewall of the first of the plurality of through-holes. The first of the plurality of through-holes may also be devoid of electrically conductive "sidewall" plating extending therethrough.

According to still further embodiments of the invention, an antenna assembly includes a printed circuit board having front and back surfaces thereon, a first plated through-hole therein and an electrically conductive pad on the back surface of the printed circuit board, which is electrically connected to the first plated through-hole. An electrically conductive feed conductor is provided on the back surface of the printed circuit board. The feed conductor extends at least partially through the first plated through-hole. A solder bond, which is provided on the back surface of the printed circuit board, extends on a surface of the electrically conductive pad and electrically connects the feed conductor to the electrically conductive pad. A metal trace is provided on the front surface of the printed circuit board and is electrically connected by the first plated through-hole to the solder bond, the feed conductor and the electrically conductive pad. In some of these embodiments of the invention, the solder bond does not extend onto a surface of the metal trace and may only extend partially through the first plated through-hole. The printed circuit board may also have a second plated through-hole therein, which extends adjacent the first plated through-hole and electrically connects the metal trace to the electrically conductive pad, in parallel with the electrical connection provided by the first plated through-hole.

DETAILED DESCRIPTION OF EMBODIMENTS

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 3:
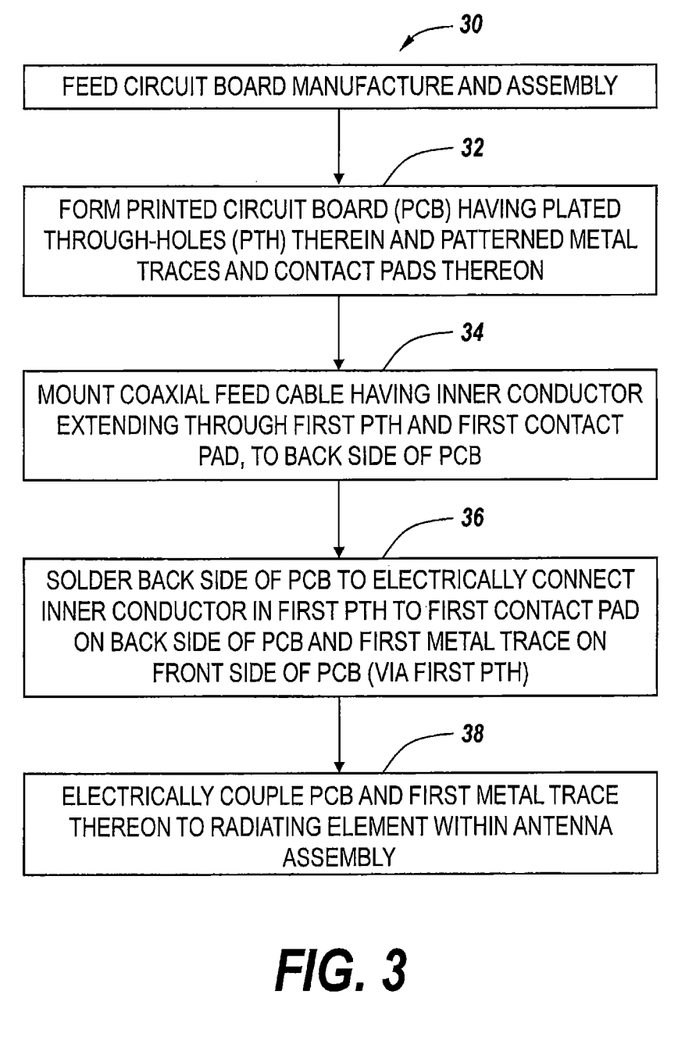
FIG. 3 is a flow diagram of process steps that illustrates methods of manufacturing feed circuit boards for base station antennas BSAs, according to an embodiment of the invention.

Referring now to FIG. 3, methods of manufacturing feed circuit boards for base station antennas 30 according to some embodiments of the invention can include forming a printed circuit board (PCB) having at least one plated through-hole (PTH) therein, a metal trace (e.g., 50-ohm trace) on a front surface thereof and at least one contact pad on a back surface thereof, Block 32. As shown by Block 34, a coaxial feed cable having an outer conductor and a shielded inner conductor may be mounted to a back side of the PCB, so that the shielded inner conductor passes through a first contact pad on the back surface and through a first PTH, which is electrically connected (e.g., by sidewall plating) to the first contact pad on the back surface and to a first metal trace on the front surface. Thereafter, as shown by Block 36, the back side of the PCB undergoes a soldering operation so that the inner conductor (within the first PTH) is soldered to the first contact pad and thereby electrically connected to the first metal trace via the first PTH, which may become at least partially filled with solder. Finally, as shown by Block 38, an operation may be performed to electrically couple the first metal trace on the front surface of the PCB to a radiating element within an antenna assembly.

Figure 4:
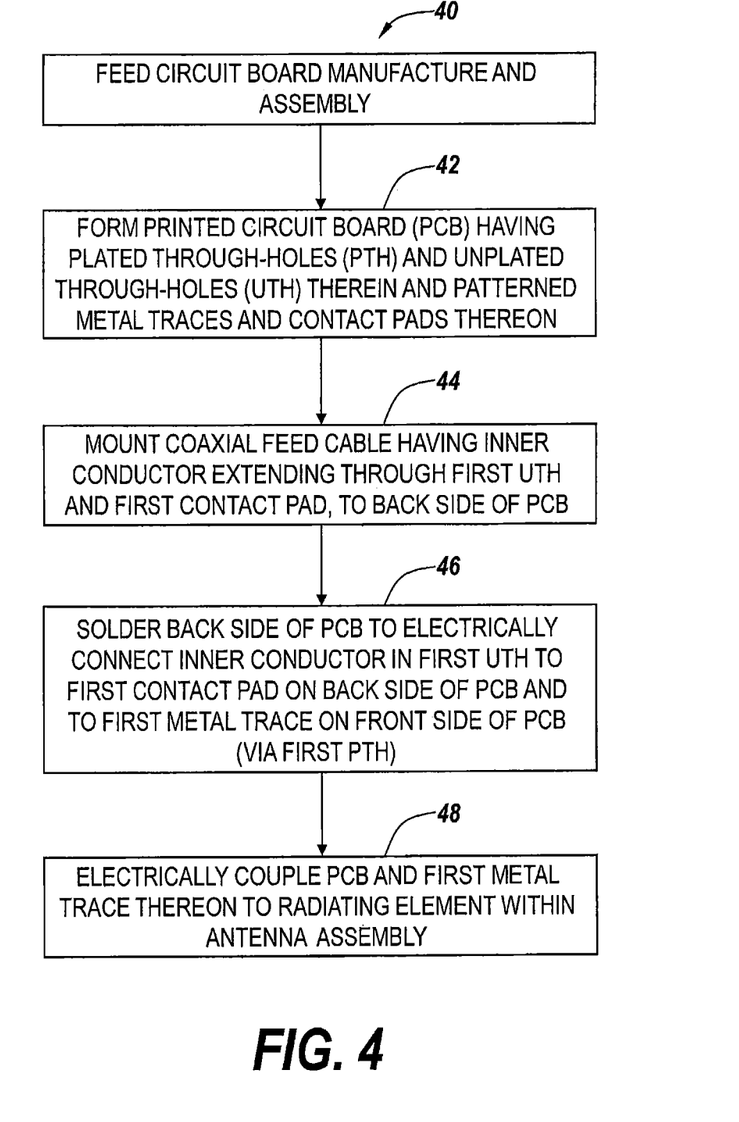
FIG. 4 is a flow diagram of process steps that illustrates methods of manufacturing feed circuit boards for base station antennas, according to an embodiment of the invention.

Alternatively, as shown by FIG. 4, methods of manufacturing feed circuit boards for base station antennas 40 can include forming a printed circuit board (PCB) having both plated through-holes (PTH) and unplated through-holes (UTH) therein, with patterned metal traces and contact pads thereon, Block 42. Next, as shown by Block 44, a coaxial feed cable may be mounted to a back surface of the PCB. As will be understood by those skilled in the art, the outer electrically conductive "shield" of the coaxial feed cable may be soldered to a ground plane on the back surface of the PCB. Moreover, the inner conductor within the coaxial feed cable may be configured to extend through a first contact pad (on the back surface) and through a first UTH in the PCB. After (or during) the mounting of the coaxial feed cable, the back side of the PCB can undergo a soldering operation to electrically connect the inner conductor, which extends at least partially through the first UTH, to the first contact pad, Block 46. This soldering operation may also provide an electrical connection between the inner conductor and a first metal trace on a front surface of the PCB, which is provided by at least a first PTH that may provide reduced PIM distortion to a feed signal provided on the inner conductor. This first PTH, which may be filled with electrically conductive material or unfilled (i.e., plating only on sidewall of the through-hole), can be electrically connected to the first contact pad on the back surface and the first metal trace on the front surface. Finally, as shown by Block 48, an operation may be performed to electrically couple the first metal trace on the front surface of the PCB to a radiating element within an antenna assembly.

Figure 5A:
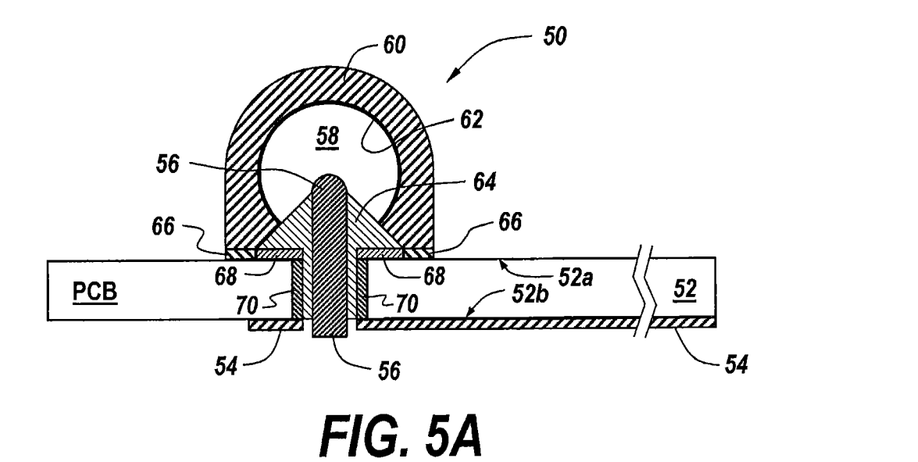
FIG. 5A is a cross-sectional view of a portion of a printed circuit board (PCB) having a coaxial cable mounted to a backside thereof, with both its outer and inner conductors solder bonded to the backside and with the inner conductor electrically connected to a front side metal trace (via a plated through-hole (PTH)), according to an embodiment of the present invention.
Figure 5B:
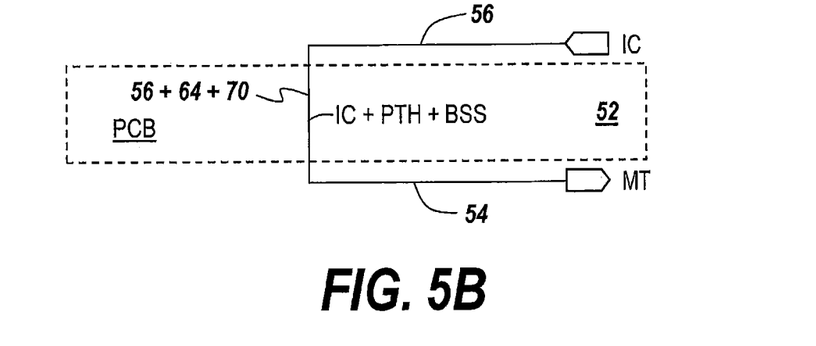
FIG. 5B is a simplified wiring schematic showing a wiring path of the inner conductor of FIG. 5A, according to an embodiment of the present invention.

Referring now to FIG. 3 and FIGS. 5A-5B, a feed circuit board 50, which may be utilized in a base station antenna assembly to inhibit passive intermodulation (PIM) distortion, is illustrated as including a printed circuit board (PCB) 52 having a back side surface 52a and a front side surface 52b thereon. As shown, a coaxial cable having an electromagnetically shielded inner conductor 56, which is spaced by a dielectric medium 58 from a surrounding outer conductor 62, is mounted to the back side surface 52a of the PCB 52. This coaxial cable may be mechanically and electrically secured to the PCB 52 using shield solder 60 that is secured to a ground line/plane 66, which is patterned on the back side surface 52a.

As shown, a portion of the inner conductor 56 at a distal end of the coaxial cable may be exposed and bent 90° so that the inner conductor 56 extends through a metal plated through-hole (PTH) 70 within the PCB 52. Advantageously, this inner conductor 56 forms a high conductivity electrical connection with a metal trace 54 (e.g., 50 ohm trace) on the front side surface 52b, via a solder bond 64 applied to a patterned contact pad 68 on the back side surface 52a during manufacture. This contact pad 68 is electrically isolated from the ground line/plane 66, but may be patterned concurrently with the ground line/plane 66 using conventional metal patterning techniques. Thus, as shown by the simplified wiring schematic of FIG. 5B, an inner conductor (IC) 56, which can be driven with an antenna feed signal, is electrically connected to a metal trace 54 on a front side surface of a PCB 52, via a plated through-hole (PTH) 70 and back side solder (BSS) 64.

Figure 6A:
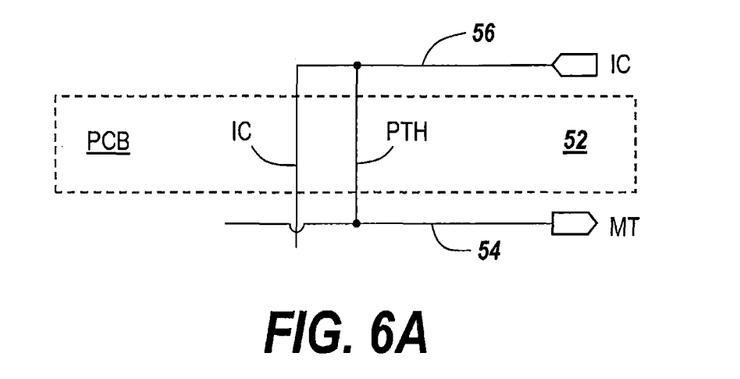
FIG. 6A is a simplified wiring schematic of an inner conductor of a back side coaxial cable, which passes through an unplated through-hole (UTH) of a printed circuit board (PCB) and is electrically connected by an adjacent plated through-hole (PTH) to a front side metal trace (MT), according to an embodiment of the present invention.
Figure 6B:
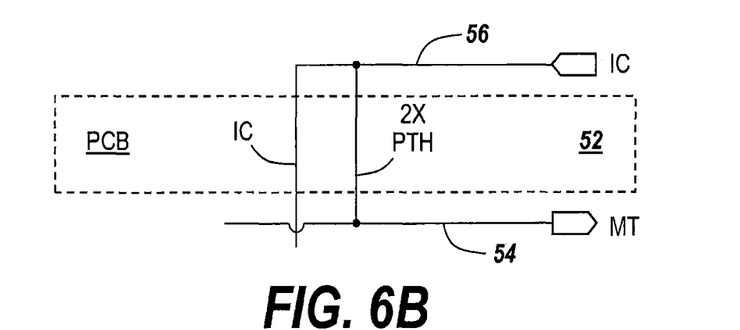
FIG. 6B is a simplified wiring schematic of an inner conductor of a back side coaxial cable, which passes through an unplated through-hole (UTH) of a printed circuit board (PCB) and is electrically connected by a pair (2×) of adjacent plated through-holes (PTH) to a front side metal trace (MT), according to an embodiment of the present invention.
Figure 6C:
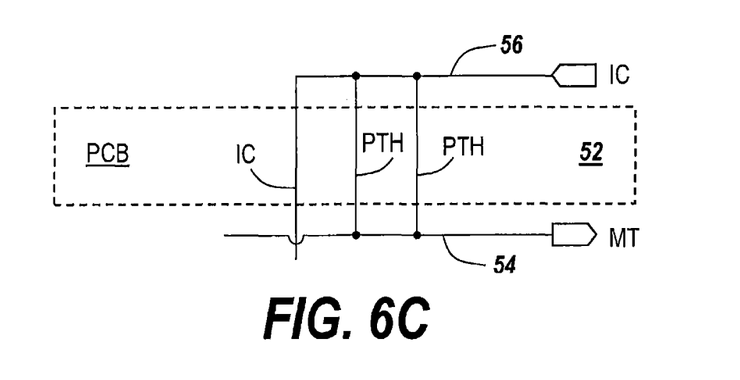
FIG. 6C is a simplified wiring schematic of an inner conductor of a back side coaxial cable, which passes through an unplated through-hole (UTH) of a printed circuit board (PCB) and is electrically connected by a pair (2×) of adjacent plated through-holes (PTH) to a front side metal trace (MT), according to an embodiment of the present invention.
Figure 6D:
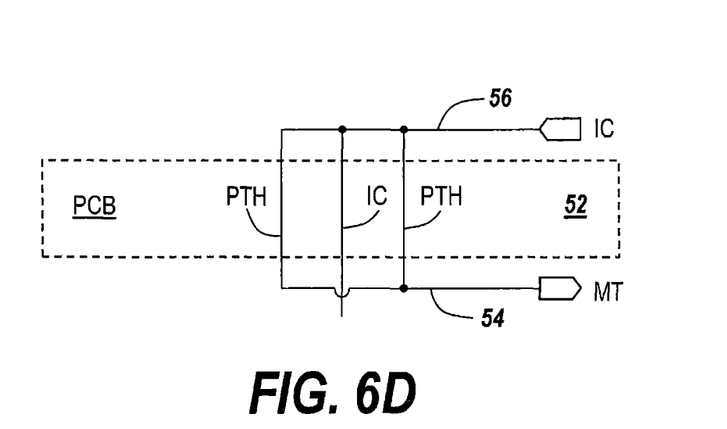
FIG. 6D is a simplified wiring schematic of an inner conductor of a back side coaxial cable, which passes through an unplated through-hole (UTH) of a printed circuit board (PCB) and is electrically connected by a pair (2×) of adjacent plated through-holes (PTH) to a front side metal trace (MT), according to an embodiment of the present invention.
Figure 7A:
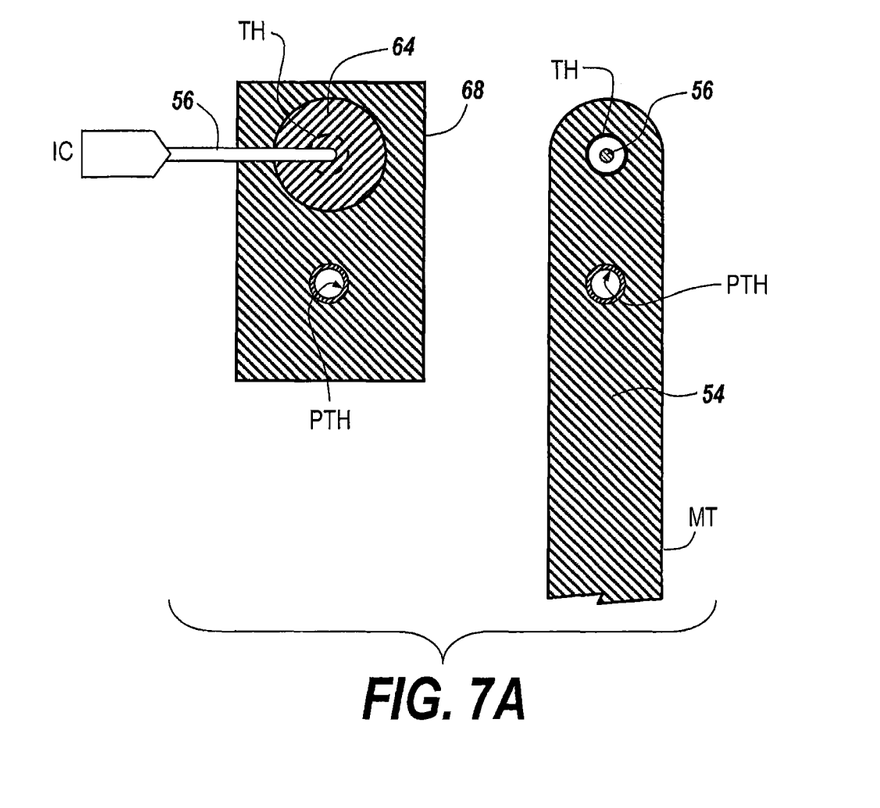
FIG. 7A is a plan layout view of a back side "inner conductor" contact pad (left) and front side metal trace (MT) (right), which is electrically connected by a plated through-hole (PTH) to the contact pad (and inner conductor), according to an embodiment of the present invention and FIG. 6A.
Figure 7B:
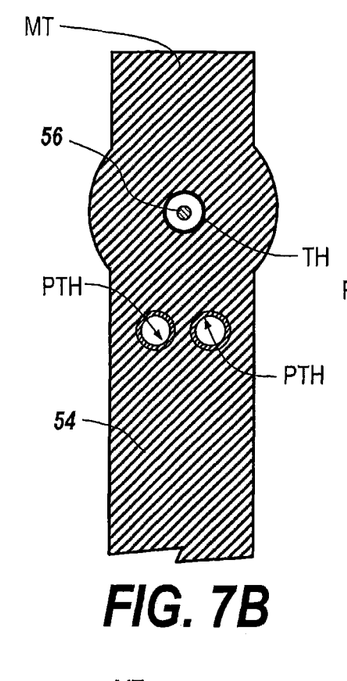
FIG. 7B is a plan layout view of a front side metal trace (MT) that intersects a pair of side-by-side plated through-holes (PTHs) in a PCB, according to an embodiment of the present invention and FIG. 6B.
Figure 7C:
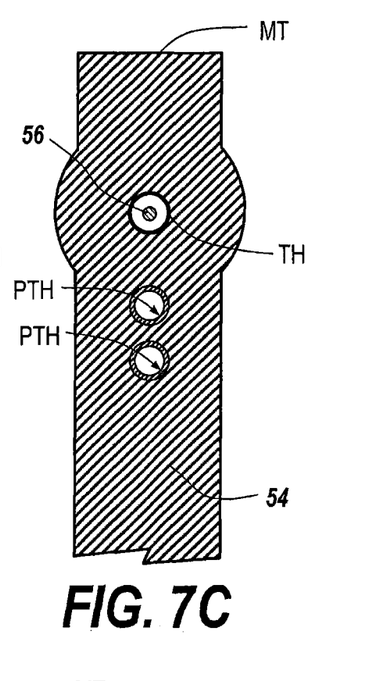
FIG. 7C is a plan layout view of a front side metal trace (MT) that intersects a pair of aligned plated through-holes (PTHs) in a PCB, according to an embodiment of the present invention and FIG. 6C.
Figure 7D:
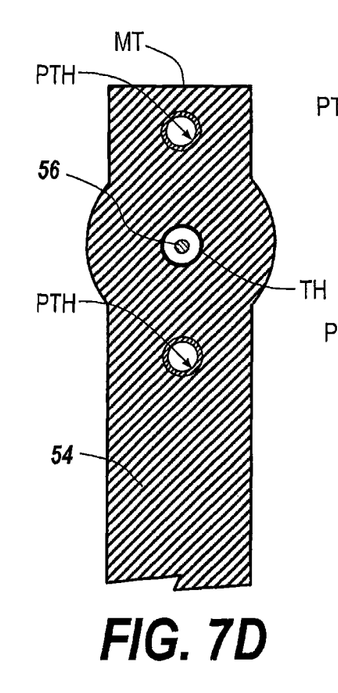
FIG. 7D is a plan layout view of a front side metal trace (MT) that intersects a pair of plated through-holes (PTHs) in a PCB, according to an embodiment of the present invention and FIG. 6D.

Referring now to FIGS. 6A and 7A, a simplified wiring schematic and a plan layout view of a back side "inner conductor" contact pad and a front side metal trace, which may be utilized advantageously to reduce PIM distortion in an antenna feed board, collectively illustrate a patterned contact pad 68 and a patterned metal trace MT 54 according to an embodiment of the present invention. The patterned contact pad 68, which is disposed on a back side surface of a PCB 52, is illustrated as having a solder bond 64 thereon, which receives and secures an inner conductor (IC) 56 of a coaxial feed cable to the patterned contact pad 68. This inner conductor 56 extends at least partially through an unplated through-hole TH in the PCB 52, and the front side metal trace MT 54 has an opening therein that surrounds the unplated TH and the inner conductor 56 therein, but may not make direct electrical contact to the inner conductor 56. Instead, as illustrated by the simplified wiring schematic of FIG. 6A, a separate plated through-hole (PTH) is utilized to electrically-connect the front side metal trace 54 to the inner conductor 56, indirectly via the back side contact pad 68 and solder bond 64. According to some embodiments of the invention, this single PTH of FIGS. 6A and 7A, which electrically "shorts" the metal trace 54 to the contact pad 68, may be unfilled, partially filled or completely filled with an electrically conductive material (e.g., metal), to thereby achieve varying levels of improvement in PIM distortion associated with each alternative PTH configuration when the PTH is transferring a feed signal from the inner conductor 56 to the metal trace 54.

Figure 6E:
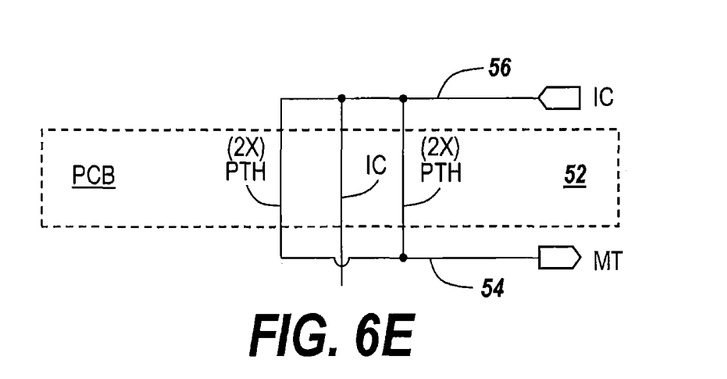
FIG. 6E is a simplified wiring schematic of an inner conductor of a back side coaxial cable, which passes through an unplated through-hole (UTH) of a printed circuit board (PCB) and is electrically connected by two pairs of adjacent plated through-holes (PTH) to a front side metal trace (MT), according to an embodiment of the present invention.
Figure 7E:
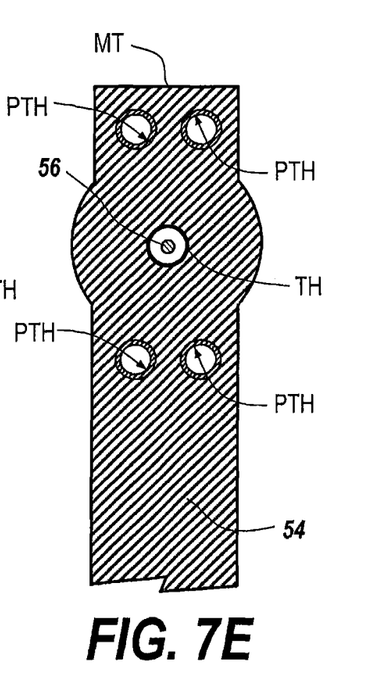
FIG. 7E is a plan layout view of a front side metal trace (MT) that intersects two pairs of plated through-holes (PTHs) in a PCB, according to an embodiment of the present invention and FIG. 6E.
Figures 7F, 7G:
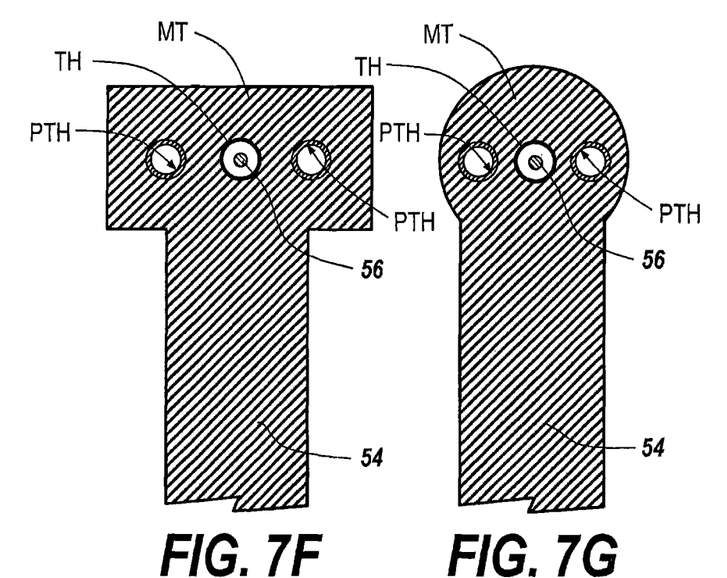
FIG. 7F is a plan layout view of a front side of a metal trace (MT) that intersects a pair of plated through-holes (PTHs) in a PCB, according to an embodiment of the present invention.
FIG. 7G is a plan layout view of a front side of a metal trace (MT) that intersects a pair of plated through-holes (PTHs) in a PCB, according to an embodiment of the present invention.
Figure 7H:
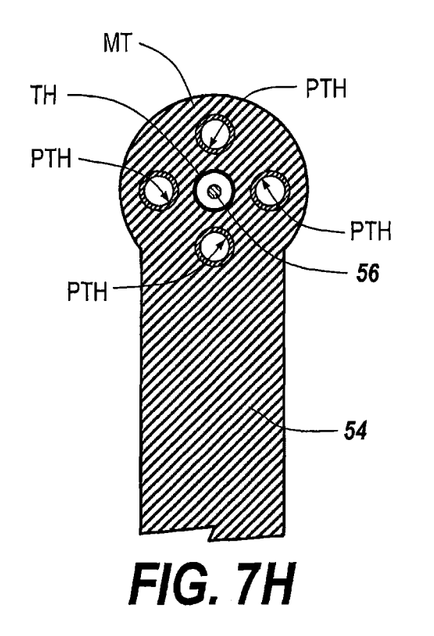
FIG. 7H is a plan layout view of a front side of a metal trace (MT) that intersects a quad arrangement of plated through-holes (PTHs) in a PCB, according to an embodiment of the present invention.

Referring now to FIGS. 6B-6D, 7B-7D and 7F-7G, the embodiment of FIGS. 6A and 7A may be modified to include a pair of PTHs, which may be spaced closely adjacent to each other or spaced apart from each other on opposite sides of an unplated through-hole TH (and inner conductor 56). Although not wishing to be bound by any theory, one or more of these paired PTHs may be unfilled, partially filled or completely filled with an electrically conductive material (e.g., metal) with varying levels of improvement in PIM distortion associated with each alternative PTH configuration. Moreover, as shown by FIGS. 6E, 7E and 7H, a quad arrangement of PTHs, which at least partially surround an unplated through-hole TH, may be utilized with varying levels of improvement in PIM distortion. Finally, in some further embodiments of the invention, the unplated through-holes TH illustrated by FIGS. 7A-7H may be replaced with plated through-holes (PTHs) containing respective inner conductors 56 and solder material extending at least partially therethrough.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An antenna assembly, comprising:
   a printed circuit board having front and back surfaces thereon and a first plated through-hole therein;
   an electrically conductive pad on the back surface of said printed circuit board, electrically connected to the first plated through-hole;
   an electrically conductive feed conductor on the back surface of the printed circuit board, said feed conductor extending at least partially through the first plated through-hole;
   a solder bond on the back surface of the printed circuit board, said solder bond extending on a surface of said electrically conductive pad and electrically connecting said feed conductor to said electrically conductive pad; and
   a metal trace on the front surface of said printed circuit board, electrically connected by the first plated through-hole to said feed conductor, said electrically conductive pad, and to said solder bond, and wherein said solder bond does not extend onto a surface of said metal trace.

2. The antenna assembly of claim 1, wherein said printed circuit board has a second plated through-hole therein; and wherein said metal trace is electrically connected to said electrically conductive pad by the second plated through-hole.

3. The antenna assembly of claim 2, wherein said printed circuit board has a third plated through-hole therein, which extends immediately adjacent the second plated through-hole; and wherein said metal trace is electrically connected to said electrically conductive pad by the third plated through-hole.

4. The antenna assembly of claim 3, wherein the second and third plated through-holes are filled with electrically conductive material.

5. The antenna assembly of claim 3, wherein the second and third plated through-holes are completely filled with electrically conductive material, but the first plated through-hole is only partially filled with electrically conductive material.

6. The antenna assembly of claim 1, wherein said electrically conductive feed conductor is a central conductor of a shielded coaxial cable; and wherein a portion of the first plated through-hole extending adjacent the front surface of said printed circuit board is devoid of solder.

7. An antenna assembly, comprising:
a printed circuit board having front and back surfaces thereon and a first plated through-hole therein;
an electrically conductive pad on the back surface of said printed circuit board, electrically connected to the first plated through-hole;
an electrically conductive feed conductor on the back surface of said printed circuit board, said feed conductor extending at least partially through the first plated through-hole;
a solder bond on the back surface of said printed circuit board, said solder bond extending on a surface of said electrically conductive pad and electrically connecting said feed conductor to said electrically conductive pad; and
a metal trace on the front surface of said printed circuit board, electrically connected by the first plated through-hole to said feed conductor, said electrically conductive pad, and to said solder bond, and wherein said solder bond extends only partially through the first plated through-hole.

8. An antenna assembly, comprising:
a printed circuit board having front and back surfaces thereon and a first plated through-hole therein;
an electrically conductive pad on the back surface of said printed circuit board, electrically connected to the first plated through-hole;
an electrically conductive feed conductor on the back surface of said printed circuit board, said feed conductor extending at least partially through the first plated through-hole;
a solder bond on the back surface of said printed circuit board, said solder bond extending on a surface of said electrically conductive pad and electrically connecting said feed conductor to said electrically conductive pad; and
a metal trace on the front surface of said printed circuit board, electrically connected by the first plated through-hole to said feed conductor, said electrically conductive pad, and to said solder bond, and wherein said solder bond does not extend onto the front surface of said printed circuit board.

9. The antenna assembly of claim 8, wherein said printed circuit board has a second plated through-hole therein, which extends adjacent the first plated through-hole and electrically connects said metal trace to said electrically conductive pad.

10. The antenna assembly of claim 8, wherein said printed circuit board has a second plated through-hole therein; and wherein said metal trace is electrically connected to said electrically conductive pad by the second plated through-hole.

11. The antenna assembly of claim 10, wherein said printed circuit board has a third plated through-hole therein, which extends immediately adjacent the second plated through-hole; and wherein said metal trace is electrically connected to said electrically conductive pad by the third plated through-hole.

12. The antenna assembly of claim 11, wherein the second and third plated through-holes are filled with electrically conductive material.

13. The antenna assembly of claim 11, wherein the second and third plated through-holes are completely filled with electrically conductive material, but the first plated through-hole is only partially filled with electrically conductive material.

14. The antenna assembly of claim 8, wherein said electrically conductive feed conductor is a central conductor of a shielded coaxial cable; and wherein a portion of the first plated through-hole extending adjacent the front surface of said printed circuit board is devoid of solder.

* * * * *